United States Patent [19]

Suzuki

[11] Patent Number: 4,897,740

[45] Date of Patent: Jan. 30, 1990

[54] RECORDING/REPRODUCING SYSTEM FOR A MAGNETIC RECORDING MEDIUM INCLUDING SYNCHRONIZATION DETECTING CIRCUIT

[75] Inventor: Hiroshi Suzuki, Monroeville, Pa.

[73] Assignee: Kabushiki Kaisha Toshiba, Kawasaki, Japan

[21] Appl. No.: 220,373

[22] Filed: Jul. 11, 1988

Related U.S. Application Data

[63] Continuation of Ser. No. 66,975, Jun. 29, 1987, abandoned.

[30] Foreign Application Priority Data

Jun. 30, 1986 [JP] Japan ................................. 61-153530

[51] Int. Cl.$^4$ ...................... G11B 27/22; G11B 15/02; G11B 20/16; G11B 5/09
[52] U.S. Cl. ........................................ 360/51; 360/61; 360/66; 360/62
[58] Field of Search ....................... 360/46, 66, 61, 51, 360/62

[56] References Cited

U.S. PATENT DOCUMENTS 4,553,178 11/1985 Lynch .................................... 360/46

FOREIGN PATENT DOCUMENTS 53142386 5/1980 Japan ..................................... 360/66
61-80566 4/1986 Japan .

OTHER PUBLICATIONS

Imamura, et al., "Barium Ferrite Perpendicular Recording Floppy Disk", Toshiba Review No. 154, Winter 1985, pp. 18-22.

Primary Examiner—Alan Faber
Assistant Examiner—Kevin J. fournier
Attorney, Agent, or Firm—Foley & Lardner, Schwartz, Jeffery, Schwaab, Mack, Blumenthal & Evans

[57] ABSTRACT

A data separator system has a PLL circuit for out-putting data pulses and clock pulses on the basis of the read data from a magnetic recording medium. The system also includes an external synchronization detection circuit which detects the synchronization data (predetermined zero pattern data) recorded in the synchronization area of the magnetic recording medium, on the basis of the read data. When detecting the synchronization data, the synchronization detection circuit enables the PLL circuit to oscillate in synchronism with the read data. The data pulses and clock pulses output from the PLL circuit are also supplied to an internal synchronization detection circuit. On the basis of the data pulses and the clock pulses, the internal synchronization detection circuit detects the synchronization data, and upon detection thereof, a floppy disk controller performs the data readout operation. The system further comprises a preventing circuit which prevents the PLL circuit from performing the synchronizing operation to the read data, which is read out from the overwritten area in the magnetic recording medium by the preceding-erase type magnetic head.

25 Claims, 5 Drawing Sheets

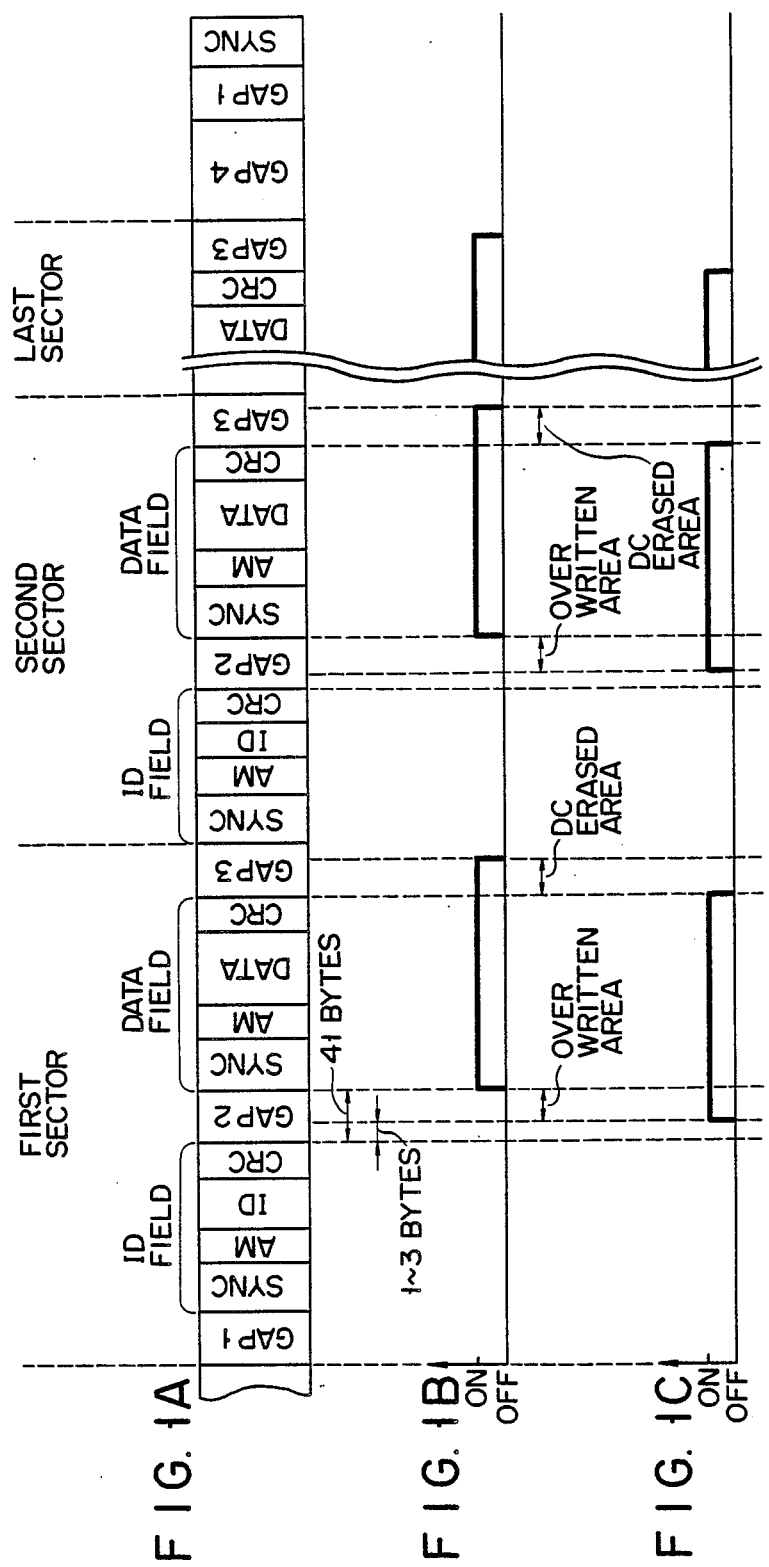

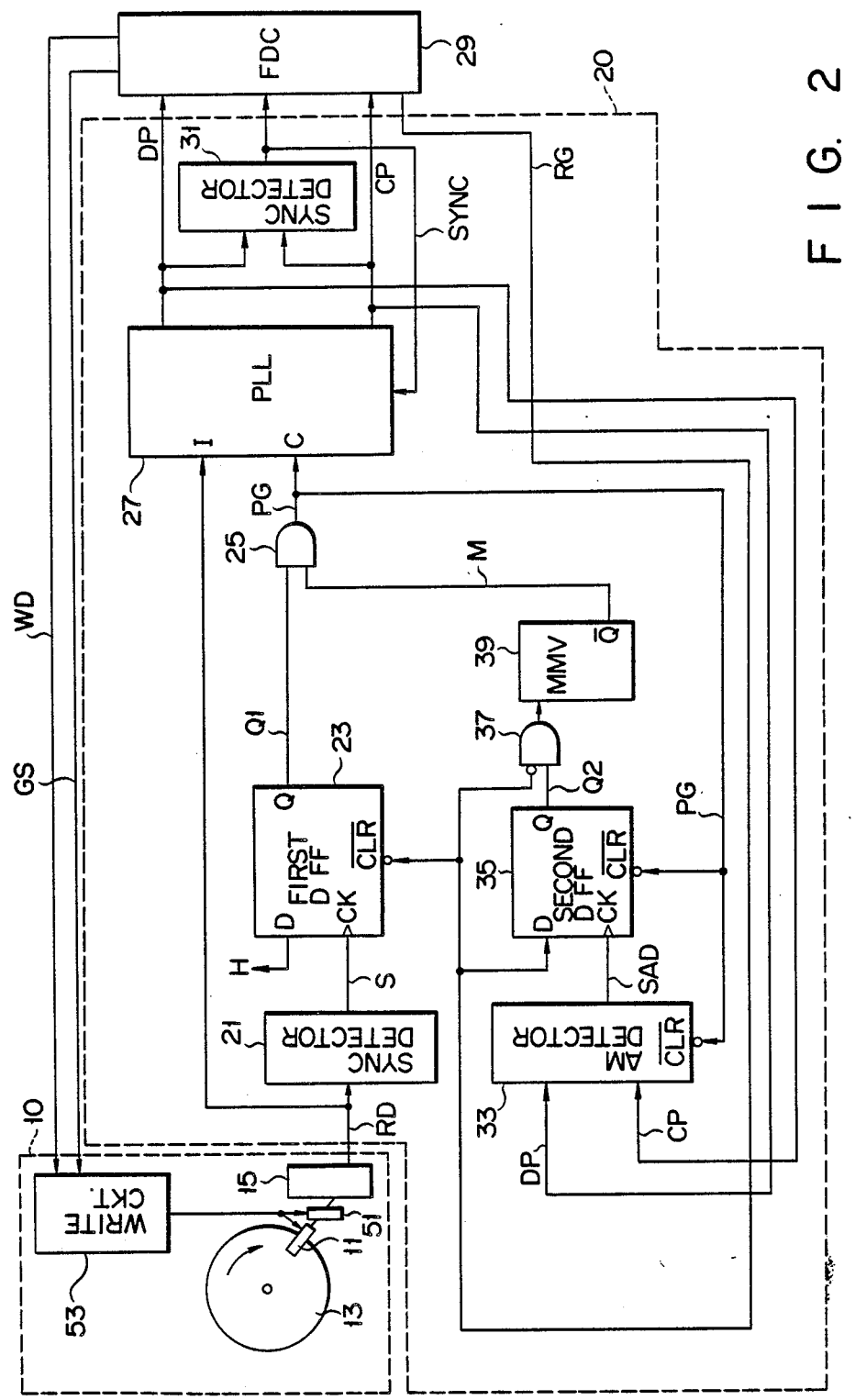
F I G. 2

RECORDING/REPRODUCING SYSTEM FOR A MAGNETIC RECORDING MEDIUM INCLUDING SYNCHRONIZATION DETECTING CIRCUIT

This application is a continuation, of application Ser. No. 066,975, filed June 29, 1987, now abandoned.

BACKGROUND OF THE INVENTION

The present invention relates to a recording/reproducing system for a magnetic recording medium.

In the field of floppy disk apparatuses, a preceding-erase type magnetic head has recently been devised, which is suitable for use with a high-density magnetic recording medium (disk). In the preceding-erase type magnetic head, an erase head is located in front of a read/write head in the rotational direction of the medium. Before new data are recorded in the medium by the read/write head, previously recorded data are first erased by the erase head. When this type of magnetic head is employed, the erase head should preferably be turned on at a predetermined time before the recording of data on the medium by the read/write head begins, and turned off at a predetermined time before the recording of data end. However, to be able to perform such a control procedure requires a controller, for turning the heads on and off, which is complicated in its construction. The conventional controller is in capable of performing such a control procedure, and for this reason, the erase head and the read/write head are turned on or off simultaneously.

Normally, a track of a magnetic recording medium has a format shown in FIG. 1A, i.e. in which one sector comprises an ID field and a data field.

The ID field comprises a synchronization area SYNC, address mark area AM, identification area ID, and cyclic redundancy check area CRC. Information representative of the starting position and address of a sector are recorded in the ID field.

The data field records data, and comprises synchronization area SYNC, address mark area AM, data area DATA, and cyclic redundancy check area CRC.

Synchronization areas SYNC store synchronization data for a PLL circuit;
- address mark AM areas store address mark data indicative of the starting position of the ID field or the data field;
- ID area ID stores data such as the cylinder number, the side number, the sector number, and the length of the data field;
- data areas DATA store data read out or written in by a user; and
- cyclic redundancy check areas CRC store data for checking whether or not the data read out from the ID field or the data field contains an error.

Gaps 1, 2, 3, and 4 are areas for absorbing a fluctuation of rotation and an error in a mechanical alignment.

FIG. 1D shows a configuration of a preceding-erase type magnetic head. The magnetic head has an erase head, a read/write head and a separator. The separator magnetically separates the erase head from the read/write head. The erase head is located in front of the read/write head with respect to the rotational direction Z of a recording medium.

Data read out from the recording medium by the magnetic head are fed to a data separator which includes a PLL circuit and an external synchronization detecting circuit.

The external synchronization detector detects the synchronization data in the read data, and upon detection of the synchronization data, the PLL circuit begins oscillating in synchronism with the read data and outputs data pulses and clock pulses.

When the PLL circuit operates in synchronism with the read data, an internal synchronization detector detects the synchronization data on the bases of the data pulses and the clock pulses, and a floppy disk controller checks whether or not the following data are address mark data.

When the address mark data are detected, the floppy disk controller reads out the data stored in the ID area ID or in data area DATA, on the basis of the data pulses and clock pulses. When data other than the address mark data are detected, the floppy disk controller stops operating for a predetermined time period, and then repeats the above-mentioned operation.

FIGS. 1B and 1C show the positions where the erase head and read/write head of the preceding-erase type magnetic head are turned on and off during data are written in the medium. As is shown in FIGS. 1A to 1C, over-written areas are formed in Gap 2, where data are not erased by the erase head and new data are overlapped by recorded on the previously recorded data.

In such a system, when data identical to the synchronization data are recorded in the over-written areas, a problem arise in that an address detection error of the floppy disk controller may occur at the boundary between the over-written areas and the data fields. In other words, when data identical to the synchronization data are recorded in the over-written areas, the floppy disk controller detects the synchronization data at the over-written area, and waits for an address mark data. When the floppy disk controller read out the confused data, it examines whether or not the read-out data is an address mark. When the floppy disk controller judges that the read-out data is not the address mark data, it stops functioning for a predetermined time period.

If the floppy disk controller performs the above operation, it cannot read out the data of the data field which follows the boundary.

SUMMARY OF THE INVENTION

An object of the present invention is to provide a a high reliability recording/reproducing system which uses a preceding-erase type magnetic head.

To achieve the above object, a recording/reproducing system is provided which comprises a magnetic head of preceding-erase type, in contact with a flexible magnetic recording medium, for recording data on said magnetic recording medium and reading out data stored in said recording medium, said magnetic head having a read/write head for writing data on, and reading data from, said magnetic recording medium, and an erase head arranged in front of said read/write head for erasing data recorded on said magnetic recording medium;
- write means for turning said read/write head and said erase head on substantially simultaneously and for supplying a specified signal to said read/write head, thereby to erasing data recorded on said magnetic recording medium, and to write data on said magnetic recording medium;
- digital signal-outputting means for outputting a digital signal corresponding to the data read out by said read/write head from said magnetic recording medium;

PLL (Phase Locked Loop) circuit means for receiving the digital signal, and for oscillating in synchronism with the digital signal, thereby to output data pulses and clock pulses;

readout means for receiving the data pulses and the clock pulses and reading out data form said magnetic recording medium in accordance with the data pulses and the clock pulses;

external synchronization detecting means for detecting synchronization data formed of predetermined pattern data, in accordance with the digital signal, and for enabling said PLL circuit means to oscillate in synchronism with the digital signal after the synchronization data has been detected;

internal synchronization detection means for detecting the synchronization data in accordance with the data pulses and the clock pulses output from said PLL circuit means; and preventing means, for preventing said PLL circuit means from outputting the data pulses and the clock pulses when the digital signal is reproducing from overwritten areas, existing on the tracks of said magnetic recording medium, which have not been erased and in which new data has been written over the previously written data.

With such an arrangement, the data pulses (DP) and the clock pulses (CP) are prevented from being output from the PLL circuit means (27), during the time period that the digital signal (RD) reproduced from the overwritten area (GAP2) of the magnetic recording medium (13) is supplied to the PLL circuit means (27). Therefore, there never occurs the situation that the reading means (29) detects the data recorded in the overwritten area (GAP2) as the synchronization data, and that consequently the address mark detect error will occur. The recording/reproducing system with high reliability can be realized.

BRIEF DESCRIPTION OF THE DRAWINGS

FIGS. 1A to 1C show timing charts illustrating the track, the on/off timings of the read/write head when the data field is recorded, in connection with the on/off timing of the erase head;

FIG. 2 shows a block diagram illustrating a circuit configuration of a data separator system which is a first embodiment of this invention;

DETAILED DESCRIPTION OF THE PREFERRED EMBODIMENTS

Figure 1D:
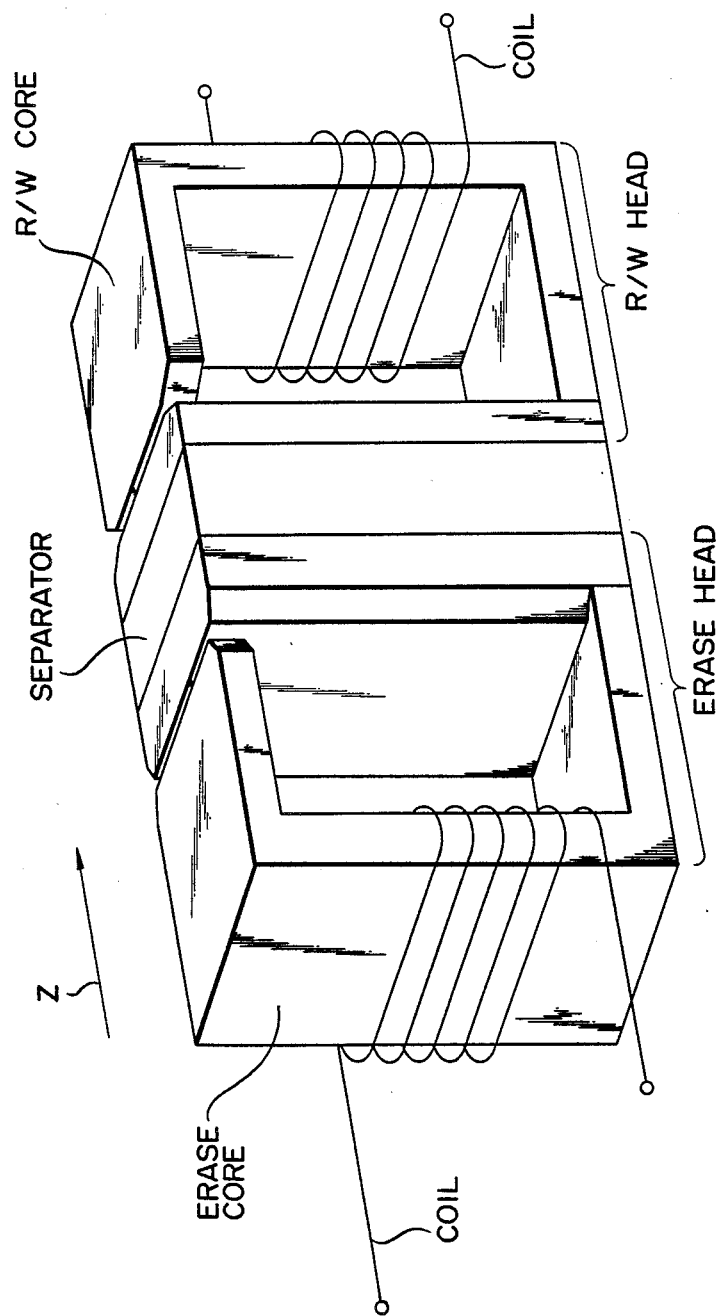
FIG. 1D shows a configuration of a preceding-erase type magnetic head.

A recording/reproducing system according to a first embodiment of this invention will be described, referring to the accompanying drawings.

Its configuration will first be described. Magnetic head 11 of floppy disk apparatus (FDP) 10 has an erase head and a read/write head same as FIG. 1D. FDC 29 receives write data WD from a host computer (not shown), and supplies write data WD to write circuit 53. FDC 29 also supplies gate signal GS to write circuit 53 and selector 51. Gate signal GS functions as a write gate signal, an erase gate signal and a select signal. The write gate signal and the erase gate signal are supplied to write circuit 53. The select signal is supplied to selector 51. Selector 51 supplies write signal to the read/write head when the select signal is ON level. Selector 51 supplies output signal of the read/write head to prestage circuit 15 when the select signal is OFF level. Prestage circuit 15 is made up of an amplifier circuit, a time domain filter, and the like. Prestage circuit 15 amplifies the input signal, converts the output of magnetic head 11 into digital data, and outputs the data.

The output data of prestage circuit 15 is supplied to external synchronization detect circuit 21 of data separator circuit 20 as read data RD. External synchronization detect circuit 21 detects the synchronization area of recording medium 13 on the basis of read data RD. In other words, external synchronization detect circuit 21 detects the synchronization data (fixed zero pattern data) recorded in the synchronization area on the basis of read data RD. External synchronization detect circuit 21 outputs an H-level pulse when it detects the synchronization data. The output signal S of external synchronization detect circuit 21 is supplied to the clock terminal CK of first D-type flip-flop (first D FF) 23. The D terminal of first D FF 23 is connected to an H level. Read gate signal RG to be described later is supplied to the low active CLR terminal of first D FF 23. First D FF 23 latches the H level signal at the leading edge of the output signal S of external synchronization detect circuit 21. The Q output Q1 of first D FF 23 is supplied to the the other input terminal of AND gate 25. Output signal PG of AND gate 25 is supplied to the control terminal C of phase locked loop (PLL) circuit 27. The read data RD is also supplied to the input terminal I of PLL circuit 27.

PLL circuit 27 is provided with a voltage controlled oscillator in it, and operates so that the phase of the output pulses is equal to that of the input pulses. When the signal supplied to the control terminal C is at H level, PLL circuit 27 oscillates in synchronism with the read data RD, and separates the read data RD into data pulses DP and clock pulses CP (read operation). Data pulses DP are a pulse signal representing the data as written into the data areas on the tracks of the recording medium 13. Clock pulses CP are a pulse signal representing the timing for reading out data. PLL circuit 27, when the signal supplied to control terminal C is low in level, oscillates in synchronism with the clock signal (at the write center frequency), which is contained in the PLL circuit per se. Data pulses DP and clock pulses CP, which are output from PLL circuit 27, are supplied to floppy disk controller (FDC) 29. FDC 29 is connected to a host computer (not shown), and the like. FDC 29, as well known, receives a read command from the host computer, and controls read gate signal RG, thereby to control read operation.

The data pulses DP and the clock pulses CP are also supplied to internal synchronization detect circuit 31. Upon detect of the synchronization data, internal synchronization detect circuit 31 outputs H level signal SYNC on the basis of the data pulses DP and the clock pulses CP, which come from PLL circuit 27. The output signal from internal synchronization detect circuit 31 is supplied to FDC 29. FDC 29, when the signal SYNC is high, executes the read/write operation of data.

The data pulse DP and the clock pulse DP, which come from PLL circuit 27, are also supplied to address mark detect circuit 33. This circuit 33 detects address mark data (predetermined pattern data) as stored in the address mark areas in the tracks on recording medium 13, on the basis of the data pulses DP and the clock pulses CP. It then outputs H-level signal SAD. Output signal PG of AND gate 25 is supplied to the low active clear terminal CLR of address mark detect circuit 33. The signal SAD is supplied to clock terminal CK of second D FF 35. Read gate signal RG (to be described later) is supplied to the D terminal of second D FF 35. The signal PG of AND gate 25 is supplied to the low active clear terminal CLR of second D FF 35. At the leading edge of signal SAD, second D FF 35 outputs an H-level signal. The Q output Q2 of second D FF 35 is supplied to the input terminal of AND gate 37. Read gate signal RG is supplied to the low active, other input terminal of AND gate 37. The output signal of AND gate 37 is supplied to the clock terminal CK of monostable multivibrator (one-shot) (MMV) 39. At the leading edge of the output signal of AND gate 37, MMV 39 outputs a pulse signal to the other input terminal of AND gate 25. The pulse signal is kept at low level during time period Tg.

Each track of magnetic recording medium 13 of this embodiment also has a format shown in FIG. 1A. And, when the data is recorded, positions on the track where the erase head is turned on and off, and positions on the track where the read/write head is turned on and off are in FIGS. 1B and 1C.

Figure 3:
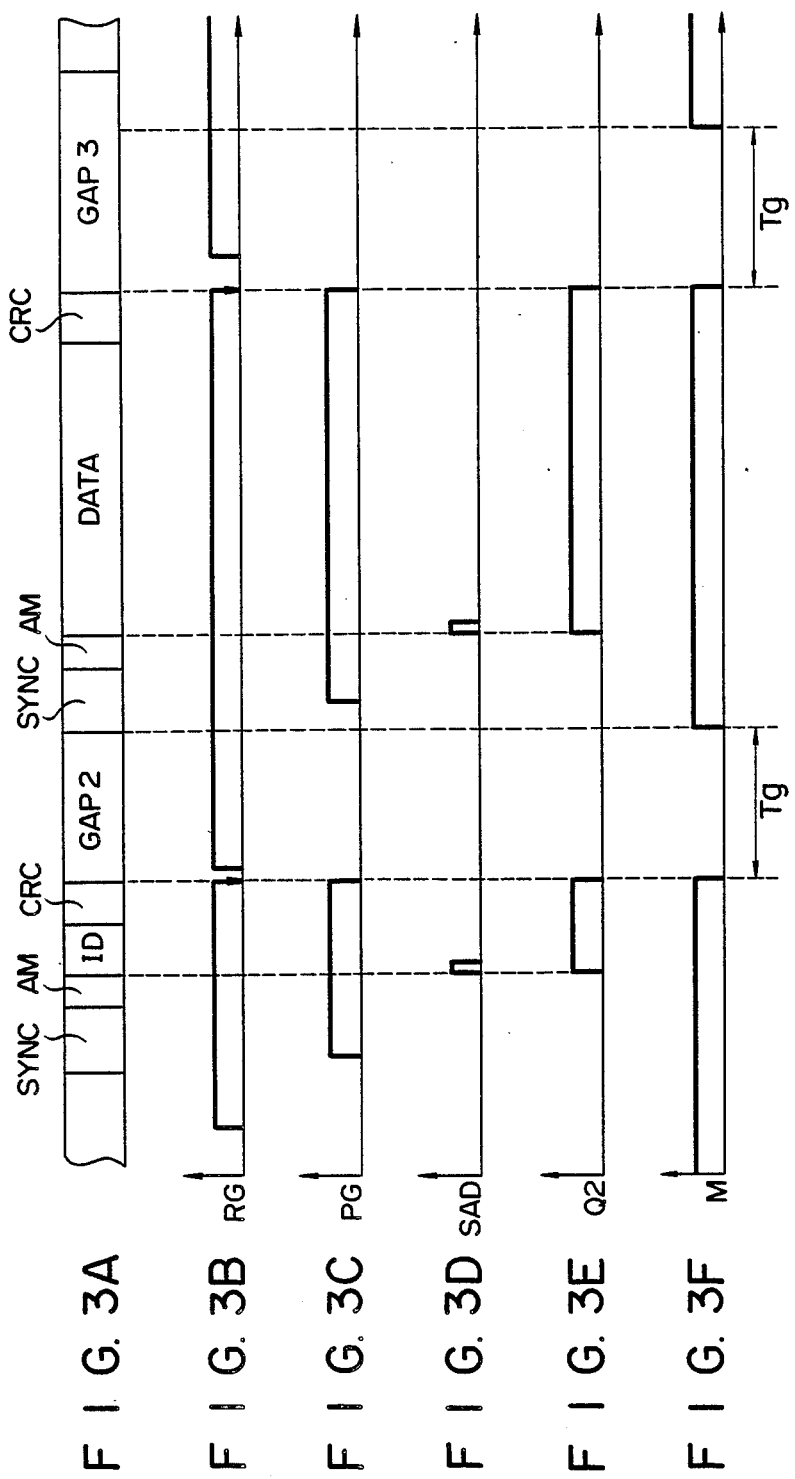
FIGS. 3A to 3F show timing charts illustrating the operation of the circuit configuration of FIG. 1.

An operation of the first embodiment will be described, referring to FIGS. 2 to 3F.

First, the recording operation will be described.

The host computer supplies a write command to FDC 29. In response to this command, FDC 29 causes the gate signal GS to rise to H level. Gate signal GS functions as write gate signal, erase gate signal and select signal. Write circuit 53 receives the write gate signal and the erase gate signal. When the write gate signal and the erase gate signal is H level, write circuit 53 generates a write signal and erase signal on the basis of write data WD supplied from the host computer via FDC 29 to write circuit 53. Write circuit 53 supplies the write signal to selector 51, and the erase signal to the erase head. When the select signal rises to H level, selector 51 supplies the write signal, which has been supplied from write circuit 53, to the read/write head.

By the above-mentioned operation, the data previously recorded on medium 13 is erased by the erase head, and new data is recorded on medium 13 by the read/write head. As shown in FIG. 1D, the read/write head lies apart from the erase head along the track of the recording medium. Therefore, as described above, when the erase head and the read/write head are turned on and off substantially simultaneously, the over-written areas and the DC-erased areas are formed on the track.

Reproducing operation will now be described.

When a host computer (not shown) sends a read command to FDC 29, FDC 29 causes gate signal GS fall to L level. When gate signal GS falls to L level, write circuit 53 stops generating the erase signal and the write signal. When the write signal is not supplied to the read/write head, read/write head reads the data recorded on medium 13, and outputs a signal corresponding to this data. When gate signal GS falls to L level, selector 51 supplies the output signal of the read/write head to prestage circuit 15. Prestage circuit 15 outputs read data RD. When external synchronization detect circuit 21 detects the synchronization data (predetermined zero pattern data) from read data RD, it outputs an H-level pulse to clock terminal CK of first D FF 23. At the leading edge of the pulse, first D FF 30 latches the H-level signal, and outputs H-level signal Q1 to AND gate 25.

In the stationary state, $\overline{Q}$ output M of MMV 39 is at high level, as shown in FIG. 3F. At the detection of the data by external synchronization detect circuit 21, AND gate 25 outputs H-level signal PG to PLL circuit 27, as shown in FIG. 3C. Upon receipt of the H-level signal, PLL circuit 27 starts the synchronizing operation for read data RD. PLL circuit 27 oscillates in synchronism with read data RD, and separates data pulses DP and clock pulses CP from read pulse RD, and outputs the pulses. On the basis of data pulses DP and clock pulses CP, internal synchronization detect circuit 31 detects the synchronization data. Upon detection, circuit 31 outputs H-level signal SYNC. When supplied with H-level signal SYNC, FDC 29 starts the data read operation.

Data pulses DP and clock pulses CP from PLL circuit 27 are supplied to address mark detect circuit 33. On the basis of data pulses DP and clock pulses CP, address mark detect circuit 33 detects the address mark data recorded in address mark area AM in the ID field. It then outputs pulse signal SAD, as shown in FIG. 3D. At the leading edge of signal SAD, second D FF 35 latches read gate signal RG. At this time, because read gate signal RG is at high level, as shown in FIG. 3B, second D FF 32 outputs H-level signal Q2, as shown in FIG. 3E. AND gate 37 keeps the outputting of the L-level signal, because read gate signal RG is high. MMV 39 keeps the outputting of H-level signal M, because no trigger is input to MMV 39. AND gate 25 also keeps the outputting of H-level signal PG. PLL circuit 27, supplied with H-level signal PG, continues the synchronizing operation for read data RD. FDC 29 reads out the data recorded in the ID field.

After completing the read operation for the ID field, FDC 29 resets read gate signal RG to the low level (FIG. 3B). Upon receipt of L-level read gate signal RG, AND gate 37 outputs an H-level signal to MMV 39. With the trigger of the leading edge of the output signal of AND gate 37, MMV 39 outputs negative pulse M. The pulse M keeps its L-level during fixed period of time Tg, as shown in FIG. 3F. The pulse width Tg is substantially equal to the time required for magnetic head 11 to read areas GAP 2 in the tracks. In other words, the pulse width Tg is substantially equal to the required for read data RD reproduced from the data overwritten area in the tracks to be supplied to PLL circuit 27. Upon receipt of negative pulse M, AND gate 25 renders control signal PG low in level, as shown in FIG. 3C. Upon receipt of L-level control signal PG, PLL circuit 27 stops the synchronizing operation for read data RD, and stops the operation for separating data pulses DP and clock pulses CP from read data RD. PLL circuit 27 synchronizes with the clock in the PLL circuit 27.

When supplied with L-level read gate signal RG, first D FF 23 is cleared. When supplied with L-level signal PG, address mark detect circuit 33 and second FF 35 are also cleared.

To read the data field, FDC 29 again renders read gate signal RG high. Afterwards, when external synchronization detect circuit 21 detects the synchronization data, the same operation as the read operation for ID field is started. PLL circuit 27 then performs the synchronizing operation for read data RD. FDC 29 performs the data readout.

When the data field has been read, FDC 29 renders read gate signal RG low. Upon receipt of negative pulse M, PLL circuit 27 stops the synchronizing operation for read data RD during fixed time period Tg. This stoppage prevents PLL circuit 27 from synchronizing with the read data RD at varying frequency that is reproduced from the DC erased area of the tracks.

As described above, during time period Tg after the data readout from the ID field or the data field completes, PLL circuit 27 does not perform the synchronizing operation for read data RD. In other words, when read data RD reproduced from the overwritten areas (GAP2) and DC erased areas (GAP3) is supplied to PLL circuit 27, PLL circuit 27 does not perform the synchronizing operation for read data RD. Even if the same data as the synchronization data is recorded in the overwritten area (GAP2), there never occurs the situation in which detect error of the address mark data occurs at the boundary between the overwritten area (GAP2) and the synchronization area (SYNC). Further, there never occurs the situation where PLL circuit 27 synchronizes with the read data at varying frequency from DC erased area (GAP3), and that the PLL circuit 27 oscillates at a frequency greatly shifted from the original oscillating frequency.

Figure 4:
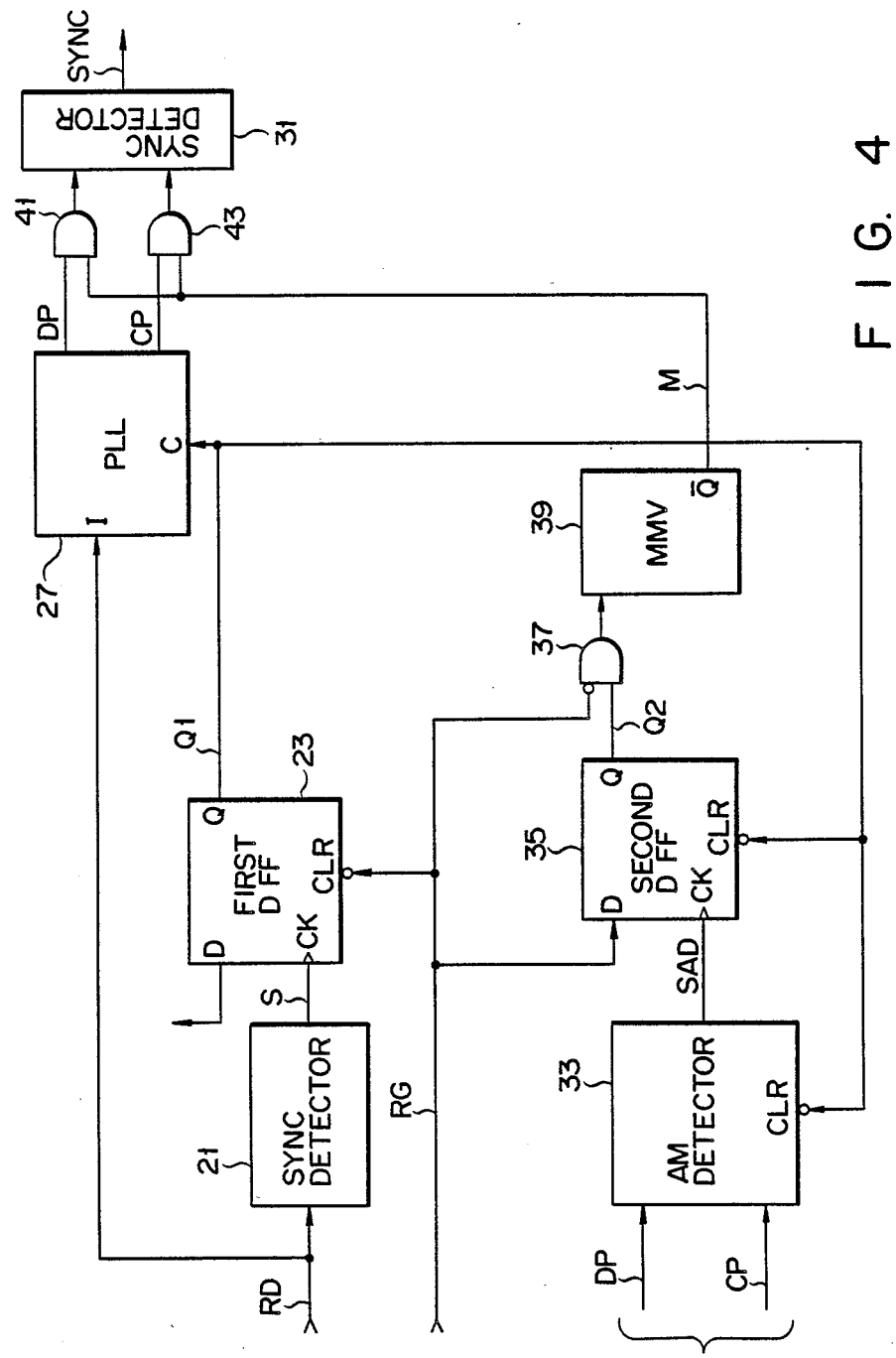
FIG. 4 shows a block diagram illustrating the configuration of a second embodiment of the data separator system according to this invention.

A second embodiment of the invention will now be described, referring to FIG. 4. FIG. 4 is a block diagram illustrating the second embodiment. The main portions of the 5 circuit are the same as those of the FIG. 2 circuit. Therefore, only the features of the second embodiment will be given. The structural features of the second embodiment, when comparing with those of the first embodiment are: (1) Signal Q1 is directly supplied to control terminal C of PLL circuit 27, with omission of AND gate 25; (2) AND gates 41 and 43 are additionally used, and clock pulses CP are supplied to one input terminal of AND gate 43, while signal M is supplied to the other input terminal of each AND gate 41 and 43; (3) The outputs of AND gates 41 and 43 are supplied to internal synchronization detect circuit 31. According to the FIG. 4 configuration, PLL circuit 27 continuously performs the synchronizing operation for read data RG even when negative pulse M is output. However, the supply of data pulses DP and clock pulses CP from PLL circuit 27 to internal synchronization detect circuit 31 is inhibited during the pulse time of negative pulse M. In other words, at least after the readout for ID field or data field, for the duration of negative pulse M, data pulses DP and clock pulses CP are not supplied to internal synchronization detect circuit 31. This prevents internal synchronization detect circuit 31 from detecting synchronization data from overwritten area GAP2. Therefore, FDC never outputs a detect error for the address mark data at the boundary between areas (GAP2) and synchronization area (SYNC).

As seen from the foregoing, according to this invention, when read data RD reproduced from GAP areas (GAP2 and GAP3 in FIG. 1A) of the tracks of the magnetic recording medium is supplied to PLL circuit 27, the PLL circuit 27 stops to oscillate in synchronism with such read data RD, or the output signals from PLL circuit which are separated by oscillating in synchronism with such read data RD are not supplied to internal synchronization detect circuit 31. Accordingly, with the recording reproducing system of this invention, the synchronization data can be accurately detected from the synchronization area of the magnetic recording medium, and normal data can be reproduced from the data area.

It is not essential that the pulse width Tg of pulse M is set to to be equal to the width corresponding to the length of gap areas GAP2 and GAP3. If the detection error of the address mark data from FDC 29 can be prevented, it is only needed that the operation of PLL circuit 27 can be stopped during at least part of the time period that the read data is supplied to circuit 27. The width Tg is appropriately selected allowing for the system characteristics.

The PLL circuit, address mark detect circuit, and synchronization detect circuits may be those known circuits. For the address mark detect circuit, for example, any circuit may be used, if it can detect the predetermined address mark data (for example, the missing cross) recorded in the address mark in the track. As a one-chip controller containing a floppy disk controller (FDC) and internal synchronization detect circuit, μDP7260 manufactured by NEC is known. Any IC with the performance comparable with that of this IC may be used.

In the embodiments, FDC29 is provided outside FDP10 and data separator circuit in FIG. 2. In practice, FDC 29 may be incorporated into FDP10 and/or circuit 20.

Present invention can be applied to FDP having a tunnel erase head, straddle erase head and so on. So, data can be correctly reproduced from a medium, on which the data has been written by the preceding-erase type magnetic head, by the FDP having the tunnel erase head or the straddle erase head.

What is claimed is:

1. A recording/reproducing system comprising:

a magnetic head of preceding-erase type, in contact with a flexible magnetic recording medium, for recording data on said magnetic recording medium and reading out data stored in said recording medium, said magnetic head having a read/write head for writing data on, and reading data from, said magnetic recording medium, and an erase head arranged in front of said read/write head for erasing data recorded on said magnetic recording medium;

write means for turning said read/write head and said erase head on substantially simultaneously and for supplying a specified signal to said read/write head, thereby to erase data recorded on said magnetic recording medium, and to write data on said magnetic recording medium;

digital signal-outputting means for outputting a digital signal corresponding to the data read out by said read/write head from said magnetic recording medium;

PLL (Phase Locked Loop) circuit means for receiving the digital signal, and for oscillating in synchronism with the digital signal, thereby to output data pulses and clock pulses;

readout means for receiving the data pulses and the clock pulses and reading out data form said magnetic recording medium in accordance with the data pulses and the clock pulses;

external synchronization detecting means for detecting synchronization data formed of predetermined pattern data, in accordance with the digital signal, and for enabling said PLL circuit means to oscillate in synchronism with the digital signal after the synchronization data has been detected;

internal synchronization detection means for detecting the synchronization data in accordance with the data pulses and the clock pulses output from said PLL circuit means; and preventing means for preventing said PLL circuit means from outputting the data pulses and the clock pulses when the digital signal is reproducing from overwritten areas, existing on the tracks of said magnetic recording medium, which have not been erased and in which new data has been written over the previously written data.

2. A system according to claim 1, wherein said preventing means prevents said PLL circuit means from outputting said data pulses and said clock pulses for a fixed period of time after the completion of the read operation of each ID field in tracks of said recording medium.

3. A system according to claim 1, wherein said PLL circuit means includes a PLL circuit, and said preventing means prevents said PLL circuit from performing the synchronizing operation for said digital signal.

4. A system according to claim 3, wherein said PLL circuit performs the synchronizing operation for a predetermined reference clock when said preventing means prevents said PLL circuit from performing the synchronizing operation for said digital signal.

5. The system according to claim 1, wherein said PLL circuit means includes a PLL circuit, and said preventing means prevents the data pulses and clock pulses output from said PLL circuit from being output to outside of said PLL circuit means.

6. The system according to claim 1, said system further comprising a floppy disk controller for reading out the data recorded on the magnetic recording medium, on the basis of said data pulses and clock pulses and the operation of the internal synchronization detect circuit, and wherein said preventing means prevents the outputting operation of the PLL circuit means for a fixed period of time following the outputting of a signal, representing the completion of the readout of data recorded in each field in tracks of said recording medium, which is output from said floppy disk controller.

7. A system according to claim 1, wherein said preventing means includes a means for outputting a signal for indicating that the readout of each field in tracks of said recording medium is completed, and a circuit for outputting an operation-preventing signal of predetermined pulse width to said PLL circuit means, in response to said signal indicating the end of the readout operation.

8. A data separator system for reading out data recorded in a magnetic recording medium, said system comprising:

magnetic disk apparatus means having a preceding-erase type magnetic head in contact with a flexible magnetic recording medium, for reading out data from said recording medium, and for outputting read data which corresponds to data read out by said magnetic head;

phase-locked loop (PLL) circuit means for receiving said read data, for oscillating in synchronism with said read data, and for outputting data pulses and clock pulses;

external synchronization-detecting means for detecting synchronization data consisting of predetermined pattern data, on the basis of said read data, and for enabling said PLL circuit means to oscillate in synchronism with said read data when the synchronization data is detected;

internal synchronization-detecting means for detecting said synchronization data on the basis of said data pulses and said clock pulses output from said PLL circuit means; and preventing means for preventing said PLL circuit means from outputting said data pulses and said clock pulses when the read data reproduced from an overwritten area in tracks of said recording medium is supplied to said PLL circuit means.

9. A data separator system according to claim 8, wherein said preventing means prevents said PLL circuit means from outputting said data pulses and said clock pulses for a fixed period of time after the completion of the read operation of each ID field in the tracks of said recording medium.

10. A data separator system according to claim 8, wherein said PLL circuit means includes a PLL circuit, and said preventing means prevents said PLL circuit from performing the synchronizing operation for said read data.

11. A data separator system according to claim 10, wherein said PLL circuit performs the synchronizing operation for a predetermined reference clock when said preventing means prevents said PLL circuit from performing the synchronizing operation for said read data.

12. The data separator system according to claim 8, wherein said PLL circuit means includes a PLL circuit, and said preventing means prevents the data pulses and clock pulses output from said PLL circuit from being output to outside of said PLL circuit means.

13. The data separator system according to claim 8, said system further comprising a floppy disk controller for reading out the data recorded on the magnetic recording medium, on the basis of said data pulses and clock pulses and the operation of the internal synchronization detect circuit, and wherein said preventing means prevents the outputting operation of the PLL circuit means for a fixed period of time following the outputting of a signal, representing the completion of the readout of data recorded in each field in tracks of said recording medium, which is output from said floppy disk controller.

14. A data separator system according to claim 8, wherein said preventing means includes a means for outputting a signal for indicating that the readout of each field in tracks of said recording medium is completed, and a circuit for outputting an operation-preventing signal of predetermined pulse width to said PLL circuit means, in response to said signal indicating the end of the readout operation.

15. A recording/reproducing system for a rotating flexible magnetic recording medium having data recording areas for recording data, comprising:

signal read/write means for reproducing a read signal from said magnetic recording medium and recording a write signal on said magnetic recording medium;

said signal read/write means including a magnetic head of preceding-erase type having a read/write head for recording said write signal on said magnetic recording medium and reproducing a signal corresponding to said read signal from said magnetic recording medium, and an erase head arranged on an upstream side of said read/write head, along the direction of rotation of said recording medium, for erasing a signal previously recorded on said magnetic recording medium prior to recording said write signal by said read/write head;

control means for supplying said signal read/write means with write data corresponding to said write signal, to record said write data on said recording medium, said signal read/write means, according to said write data, turning said read/write head and said erase head on so that an overwritten area, in which said write signal is written over the previously recorded signal, is formed in a leading portion of each data recording area;

PLL (Phase Locked Loop) circuit means receiving said read signal, for generating data pulses and clock pulses from said read signal by oscillating in synchronism with said read signal; and preventing means for preventing said PLL circuit means from generating said data pulses and said clock pulses, by oscillating in synchronism with said read signal at least while said signal read/write means reproduces said read signal from said overwritten areas on said magnetic recording medium.

16. A recording/reproducing system according to claim 15, wherein said preventing means includes means for inhibiting said PLL circuit means from oscillating in synchronism with said read signal at least while said signal read/write means reproduces said read signal from said overwritten areas, so that said PLL circuit means does not generate said data pulses and said clock pulses in synchronism with said read signal.

17. A recording/reproducing system according to claim 16, wherein said PLL circuit means oscillates in synchronism with a predetermined reference clock while said synchronization operation for said read signal is inhibited.

18. A recording/reproducing system according to claim 15, wherein said preventing means includes gate means for inhibiting the output of said data pulses and said clock pulses at least while said signal read/write means reproduces said read signal from said overwritten areas.

19. A recording/reproducing system according to claim 15, wherein said recording medium has ID areas, each preceding one of said data recording areas, for recording address data corresponding to each data recording area, and said control means reads out said address data on the basis of said data pulses and said clock pulses from said PLL circuit means, and said preventing means prevents said PLL circuit means from generating said data pulses and said clock pulses by oscillating in synchronism with said read signal for a fixed period of time after the completion of readout of said address data by said control means.

20. A recording/reproducing system according to claim 15, wherein said control means supplies said signal read/write means with a read gate signal for permitting said signal read/write means to reproduce said read signal during readout of data from said recording medium, and said preventing means receives said read gate signal and prevents said PLL circuit means from generating said data pulses and said clock pulses by oscillating in synchronism with said read signal for a fixed period of time after the completion of the data readout operation.

21. A recording/reproducing system for a rotating flexible magnetic recording medium having data recording areas for recording data, ID areas each preceding one of said data recording areas for recording address data corresponding to each data recording area, and gap areas each for separating one of said data recording areas from one of said ID areas, comprising:

signal read/write means for reproducing a read signal from said magnetic recording medium and recording a write signal on said magnetic recording medium;

said signal read/write means including a magnetic head of preceding-erase type having a read/write head for recording said write signal on said magnetic recording medium and reproducing a signal corresponding to said read signal from said magnetic recording medium, and an erase head arranged on an upstream side of said read/write head, along the direction of rotation of said recording medium, for erasing a signal previously recorded on said magnetic recording medium prior to recording said write signal by said read/write head;

read/write control means for supplying said signal read/write means with write data corresponding to said write signal, to record said data on said recording medium;

said signal read/write means, according to said write data, turning said read/write head and said erase head on so that overwritten areas, in which said write signal is written over the previously recorded signal, and erased areas, in which the previously recorded signal, and erased areas, in which the previously recorded signal is erased but no signals are recorded, area formed in said gap areas;

PLL (Phase Locked Loop) circuit means receiving said read signal, for generating data pulses and clock pulses from said read signal by oscillating in synchronism with said read signal;

said read/write control means receiving said data pulses and said clock pulses from said PLL circuit means and generating read data in accordance with said data pulses and said clock pulses;

preventing means for preventing said PLL circuit means from generating said data pulses and said clock pulses, by oscillating in synchronism with said read signal while said signal read/write means reproduces said read signal from said gap areas on said magnetic recording medium.

22. A recording/reproducing system according to claim 21, wherein said read/write control means supplies said signal read/write means with a read gate signal for permitting said signal read/write means to reproduce said read signal during readout of address data and/or data from said ID areas and said data recording areas, and said preventing means receives said read gate signal and prevents said PLL circuit means from generating said data pulses and said clock pulses, by oscillating in synchronism with said read signal for a fixed period of time corresponding to said gap areas, after the completion of the readout operation.

23. A recording/reproducing system according to claim 22, wherein said preventing means including means for inhibiting said PLL circuit means from oscillating in synchronism with said read signal for said fixed period of time.

24. A recording/reproducing system according to claim 23, wherein said PLL circuit means oscillates in synchronism with a predetermined reference clock while said synchronization operation for said read signal is inhibited.

25. A recording/reproducing system according to claim 22, wherein said preventing means includes gate means for inhibiting the output of said data pulses and said clock pulses for said fixed period of time.

* * * * *